Dec. 11, 1934.  R. KLATT  1,984,309
STEERING GEAR FOR VEHICLES
Filed May 4, 1933   2 Sheets-Sheet 1

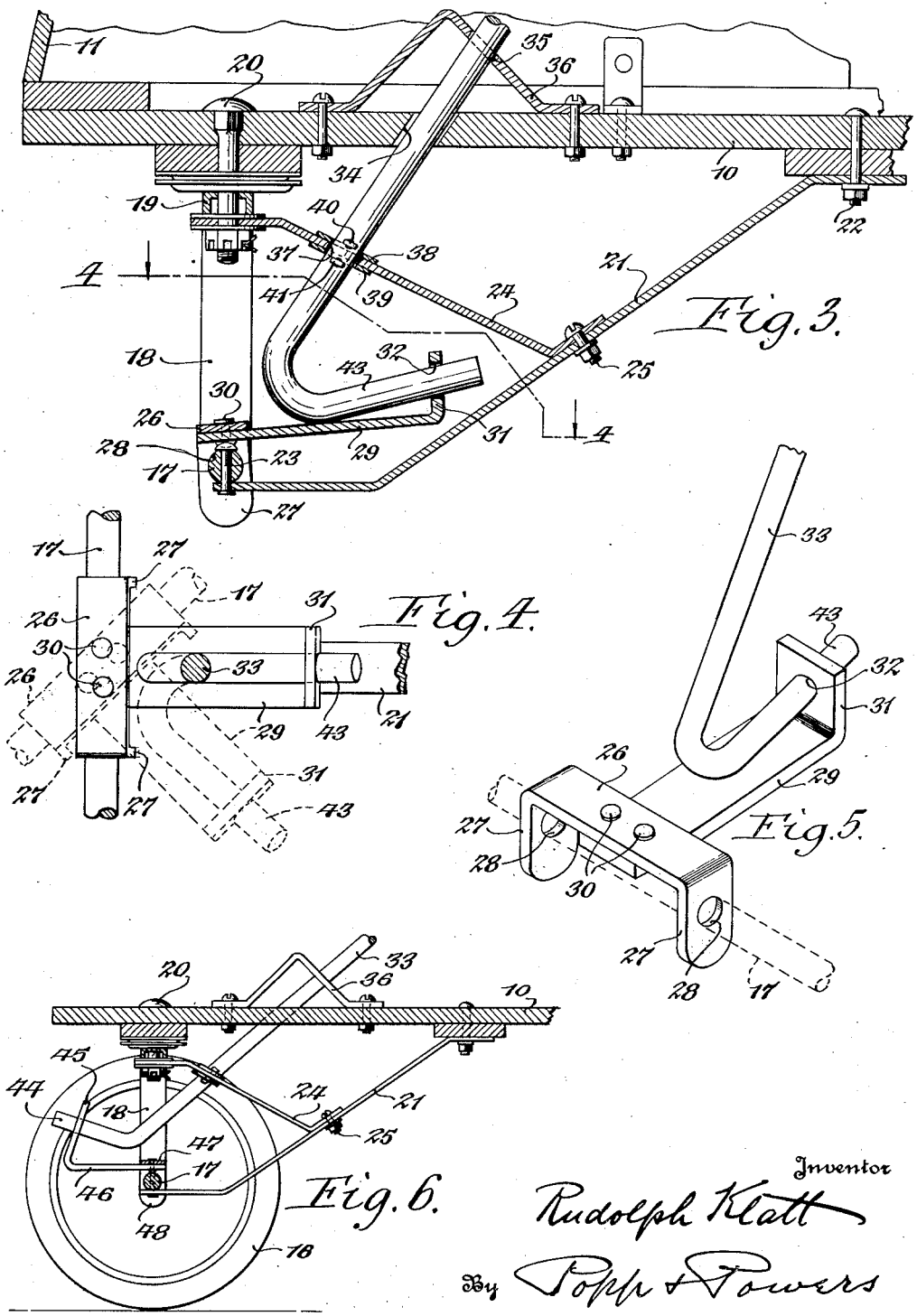

Patented Dec. 11, 1934

1,984,309

UNITED STATES PATENT OFFICE 1,984,309

STEERING GEAR FOR VEHICLES

Rudolph Klatt, North Tonawanda, N. Y., assignor to Auto-Wheel Coaster Company, Inc., North Tonawanda, N. Y., a corporation of New York Application May 4, 1933, Serial No. 669,348

1 Claim. (Cl. 280—87.5)

This invention relates to a steering gear for vehicles such as wagons, and although the same is capable of use in vehicles of various sizes and for various purposes, the same is designed more particularly for use in connection with juvenile wagons, sleds and the like.

It is the object of this invention to provide a steering gear for vehicles which is very simple and inexpensive in construction and positive and reliable in its operation, and thereby permit of using the same in juvenile wagons or sleds which must necessarily be marketed at as low a cost as possible, although this invention is equally applicable to vehicles of larger sizes, such as automobiles and the like.

In the accompanying drawings:

Figure 1 is a vertical longitudinal section of a juvenile wagon equipped with this improved steering gear.

Figure 2 is a vertical cross section, taken on line 2—2 Fig. 1.

Figure 3 is a fragmentary vertical longitudinal section, on an enlarged scale, taken on line 3—3 Fig. 2.

Figure 4 is a fragmentary horizontal section, taken on line 4—4 Fig. 3.

Figure 5 is a perspective view of part of the steering mechanism.

Figure 6 is a fragmentary vertical longitudinal section similar to Fig. 1, showing a modified form of this invention.

Figure 7 is a perspective view showing another modified form of this invention and also illustrating the same as used with ordinary sleigh-runners instead of wheels, as shown in Figs. 1, 2 and 6.

In the following description similar characters of reference indicate like parts in the several figures of the drawings:—

Referring to Figs. 1, 2 and 3 the numeral 10 represents the body of the vehicle which may be of any suitable construction as best suits the purpose for which the vehicle is intended. In this particular case the body is constructed in the form of a horizontal flat deck which may be provided on the upper side of its front part with a hood 11 resembling the engine hood of a power-driven automobile, or this deck may form the bottom of a box to permit this vehicle to be used for carrying articles.

The numeral 12 represents the rear wheels of the vehicle which form part of the means for supporting the vehicle at the rear end thereof, for which purpose they may be mounted on the vehicle body in any suitable manner, for example, by mounting these wheels at opposite ends of an axle 13 which is connected by means of a bolster 14 and a brace 15 with the rear part of the underside of the vehicle body.

The numeral 16 represents the front wheels of the vehicle which form part of the means for steering the same and also supporting the front end of the body. These front wheels are journaled on opposite ends of a horizontal axle 17 which is arranged transversely below the front part of the body and has its opposite ends secured to the lower ends of two arms 18 which form part of a U-shaped bolster, the upper ends of these arms being connected by a cross bar 19, which latter is pivoted midway of its length by means of a vertical king bolt 20 to the front part of the body, so that the front bolster and front wheels can be turned horizontally for the purpose of steering the vehicle along the road over which the same is travelling while in motion.

Tilting of the front axle and its associated parts is prevented by retaining means which preferably comprise a rearwardly inclined lower brace bar 21 connected at its upper rear end with the underside of the body by means of a bolt 22 or other suitable means, while its front end is pivotally connected by means of a pin 23 with the underside of the axle 17 vertically in line with the king bolt 20, and an upper forwardly inclined brace 24 arranged above the front part of the lower brace 21 and connected at its lower rear end with the lower brace by means of a bolt 25 or other fastening means, while its upper front end is arranged below the cross bar 19 of the bolster and receives the lower part of the king bolt 20, as best shown in Fig. 3.

The improved steering mechanism whereby the horizontal turning of the front axle and associated parts is controlled in accordance with my invention, is constructed as follows:

Upon the central part of the front axle is mounted a U-shaped yoke having an upper cross bar 26 which is arranged lengthwise over the axle and two depending arms 27 which are arranged on opposite sides of the vertical axis of the king bolt 20 and the pivot pin 23, and are provided with openings 28 whereby this yoke is journaled on the axle so that it is capable of turning vertically on the axle independently of the latter.

The numeral 29 represents a horizontal steering arm which, in the construction shown in Figs. 1–5, extends rearwardly from the cross bar of the steering yoke and has its front end secured to this cross bar by means of rivets 30, while its rear end is provided with an upwardly projecting lug 31 having an opening 32.

The numeral 33 represents a steering post which inclines rearwardly and passes through an opening 34 in the central part of the front end of the body in rear of the front axle, and may be journaled in any suitable manner so that the post can turn about its axis.

In the preferred construction, however, the steering post is journaled above the body of the vehicle in a bearing 35 formed in a bracket 36 which is secured to the upper part of the vehicle body 10, while the lower part of the post turns in an opening 37 in the upper brace 24 and is held against vertical movement therein by means of upper and lower washers 38, 39 surrounding the steering post and engaging with the upper and lower sides of the brace 24, and upper and lower cotter pins 40, 41 passing through the steering post above and below the washers 38, 39 respectively, as best shown in Fig. 3. At its upper end the steering post is provided with a steering wheel or handle 42.

In the construction shown in Figs. 1-5 the lower end of the steering post 33 terminates in rear of the axle and is provided with a crank arm 43 which is inclined obliquely relative to the axis of the steering post and projects rearwardly and upwardly therefrom through the opening 32 in the lug 31 of the steering arm 29.

When the steering post is in its central position the crank arm 43 is arranged vertically in line with the same, as shown by full lines in Figs. 1-5, in which position of the parts the front axle 17 is arranged at right angles to the length of the vehicle and causes the latter to travel straight ahead on the road. When it is desired to turn the vehicle in one direction or the other from a straight course, for example, toward the right, then the post 33 is turned in the direction for causing the crank arm 43 at its lower end to turn toward the left, whereby the steering arm 29 is caused to turn in the same direction and thereby swing the yoke and axle associated therewith in the corresponding direction, as shown by dotted lines in Fig. 4, whereby the wheels at opposite ends of the front steering axle will be caused to direct the movement of the vehicle toward the right of the road. During such turning movement of the crank arm 43 the same is raised on the respective side of the steering post, thereby causing the steering arm 29 and the yoke to turn vertically to a slight extent on the front axle, and during such relative movement of the parts the lug 31 of the steering arm 29 moves slightly forward on the crank arm 43.

The same action takes place when the crank arm is turned toward the right of the steering post when it is desired to steer the vehicle toward the left of the road.

Upon returning the steering post to its central or neutral position the crank arm is again restored to its normal position underneath the steering post, and during such action the lug 31 of the steering arm again slides slightly rearward on the crank arm, and the steering arm and yoke again swing downwardly into their lowermost position.

Instead of extending the crank arm of the steering post rearwardly from the lower end of the latter this crank arm, as shown at 44 in Fig. 6, may extend upwardly and forwardly from the lower end of the same so that it is arranged obliquely to the axis of the steering post and slide through an upwardly projecting lug 45 at the front end of a steering arm 46 which is secured at its rear end to the cross bar 47 of a yoke having depending arms 48 pivotally mounted on the front axle 17. This modified construction in effect is merely a reversal of that shown in Figs. 1-5 and its method of operation is substantially as that previously described in connection therewith.

In the construction shown in Figs. 1-6 the axle is incapable of turning and is provided at its opposite ends with wheels for supporting the same on the ground. If desired, however, the axle may be capable of rotation and its opposite ends provided with means for running the same over a slippery surface, such as snow and ice in winter time. In such a modified form of this invention, as shown in Fig. 7, the transverse front or steering axle 49 is journaled adjacent to its opposite ends in bearings 50 formed at opposite ends of a transverse bolster 51 which is pivoted midway of its length by means of a vertical king pin 52 to the underside of the vehicle body 53. Two runners 54, similar to those used on an ordinary sled, are pivotally mounted at opposite ends of the axle 49 so as to be free to adapt themselves to any irregularities in the surface of the road over which the sled is moving. Midway of its length the front steering axle 49 has rigidly connected therewith the front end of a steering arm 55, which latter projects rearwardly from this axle and is provided at its rear end with an upwardly projecting coupling lug 56 having an opening 57 which receives a crank arm 58. The latter projects upwardly and rearwardly from the lower end of a steering post 59 so as to be arranged at an oblique angle relatively to the latter, and this steering post may be journaled on the body 53 in any suitable manner and provided at its upper end with a steering wheel or handle 60.

In the operation of the construction shown in Fig. 7 the steering arm 55 turns vertically with the axle 49 whenever the crank arm 58 moves laterally away from its central position below the steering post and returns to this central position, and the lug 56 also slides back and forth on the crank arm 58 during such movement.

The several forms of this invention which are shown in the drawings are all of very simple and inexpensive construction and therefore well-suited for juvenile vehicles such as play wagons and sleds, but this invention is also well-suited for use in full-sized vehicles such as automobiles where a simple and economical construction is required. Moreover, this construction of steering mechanism is very strong and not liable to get out of order, and it permits of steering a vehicle easily and reliably so that the vehicle can be operated with safety and comfort, and thus is suited for vehicles not only of the juvenile type but also of the larger sizes which are more particularly intended for commercial use.

I claim as my invention:—

A steering gear for a vehicle having a body, and a transverse axle having a longitudinal axis but incapable of rotation about this axis, a bolster rigidly connected with said axle and pivoted midway of its length by a vertical pivot on said body so as to turn in a horizontal plane, including a rearwardly inclined steering post rotatably mounted on said body and provided at its lower end with a crank arm, a yoke having a cross bar arranged lengthwise of the axle and provided with lugs at its ends which receive said axle and which are capable of turning vertically, and a steering arm arranged lengthwise of the post and connected at one end with said cross bar and provided at its opposite end with a lug which is slidable lengthwise on said crank arm.

RUDOLPH KLATT.